(12) United States Patent
Kajioka et al.

(10) Patent No.: US 11,104,606 B2
(45) Date of Patent: Aug. 31, 2021

(54) TEMPERED GLASS PLATE AND PRODUCTION METHOD FOR TEMPERED GLASS PLATE

(71) Applicant: Nippon Electric Glass Co., Ltd., Shiga (JP)

(72) Inventors: Toshiyuki Kajioka, Shiga (JP); Mutsumu Fukada, Shiga (JP); Kiyotaka Kinoshita, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 190 days.

(21) Appl. No.: 16/310,035

(22) PCT Filed: Jun. 13, 2017

(86) PCT No.: PCT/JP2017/021729
§ 371 (c)(1),
(2) Date: Dec. 14, 2018

(87) PCT Pub. No.: WO2017/217388
PCT Pub. Date: Dec. 21, 2017

(65) Prior Publication Data
US 2019/0330104 A1    Oct. 31, 2019

(30) Foreign Application Priority Data

Jun. 17, 2016    (JP) .............................. JP2016-120489

(51) Int. Cl.
*C03C 21/00*    (2006.01)
*C03C 3/085*    (2006.01)
(Continued)

(52) U.S. Cl.
CPC ............ *C03C 21/002* (2013.01); *C03C 3/085* (2013.01); *C03C 3/091* (2013.01); *C03C 4/18* (2013.01);
(Continued)

(58) Field of Classification Search
CPC .................................................... C03C 21/002
(Continued)

(56) References Cited

U.S. PATENT DOCUMENTS

2011/0293928 A1* 12/2011 Chu .................. C03C 21/002
428/336
2012/0216570 A1* 8/2012 Abramov ............... C03C 21/008
65/30.14
(Continued)

FOREIGN PATENT DOCUMENTS

CN    102372448    3/2012
CN    103476727    12/2013
(Continued)

OTHER PUBLICATIONS

International Search Report dated Sep. 12, 2017 in International (PCT) Application No. PCT/JP2017/021729.
(Continued)

*Primary Examiner* — Lauren R Colgan
(74) *Attorney, Agent, or Firm* — Wenderoth, Lind & Ponack, L.L.P.

(57) ABSTRACT

A tempered glass sheet (G4) includes a compressive stress layer having a compressive stress on a main surface, and a tensile stress layer having a tensile stress in an inside. The tempered glass sheet (G4) includes: a highly anisotropic stress region (Qa) which is arranged in at least part of an end edge portion, and which has a stress showing anisotropy in a plane parallel to the main surface; and a low anisotropic stress region (Qb) which is arranged on a center side in a main surface direction so as to be adjacent to the highly anisotropic stress region (Qa), and which has a stress showing lower anisotropy than the highly anisotropic stress region (Qa) in the same plane parallel to the main surface.

21 Claims, 4 Drawing Sheets

(51) Int. Cl.
*C03C 3/091* (2006.01)
*C03C 17/02* (2006.01)
*C03C 17/245* (2006.01)
*C03C 4/18* (2006.01)

(52) U.S. Cl.
CPC ............ *C03C 17/02* (2013.01); *C03C 17/245* (2013.01); *C03C 2218/154* (2013.01)

(58) Field of Classification Search
USPC .......................................... 428/409, 410, 426
See application file for complete search history.

(56) References Cited

U.S. PATENT DOCUMENTS

| | | | | |
|---|---|---|---|---|
| 2013/0122254 A1* | 5/2013 | Liang | .................... | C03C 21/002 428/156 |
| 2015/0152003 A1* | 6/2015 | Kawamoto | ........... | C03C 21/002 428/220 |
| 2015/0329418 A1* | 11/2015 | Murata | ................... | C03C 17/23 428/215 |
| 2016/0357294 A1* | 12/2016 | Ozeki | ..................... | C03C 15/00 |
| 2017/0226004 A1* | 8/2017 | Gorelchenko | ........ | B32B 17/064 |
| 2017/0304980 A1* | 10/2017 | Jotz | .......................... | C03C 1/004 |
| 2019/0022979 A1* | 1/2019 | Luzzato | .................. | B32B 17/06 |
| 2019/0169061 A1* | 6/2019 | Jones | .................... | H05K 5/0017 |
| 2020/0095163 A1* | 3/2020 | Luo | ....................... | C03C 21/002 |
| 2020/0122436 A1* | 4/2020 | Mannheim Astete | .. | B32B 27/30 |

FOREIGN PATENT DOCUMENTS

| | | |
|---|---|---|
| JP | 2014-208570 | 11/2014 |
| WO | WO2014156577 | * 10/2004 |
| WO | 2012/125857 | 9/2012 |
| WO | 2015/002283 | 1/2015 |

OTHER PUBLICATIONS

International Preliminary Report on Patentability and Written Opinion of the International Searching Authority dated Dec. 18, 2018 in International (PCT) Application No. PCT/JP2017/021729.
Office Action dated Jan. 20, 2021 in corresponding Chinese Patent Application No. 201780026104.1, with English Translation.

* cited by examiner

TEMPERED GLASS PLATE AND PRODUCTION METHOD FOR TEMPERED GLASS PLATE

TECHNICAL FIELD

The present invention relates to a tempered glass sheet and a method of producing the same. More specifically, the present invention relates to a tempered glass sheet which has been chemically tempered by an ion exchange method, and a method of producing the same.

BACKGROUND ART

In a touch panel display to be mounted on an electronic device, such as a smartphone or a tablet PC, a tempered glass sheet which has been chemically tempered has hitherto been used as a cover glass.

Such tempered glass sheet is generally produced by chemically treating a glass sheet containing an alkali metal as a composition with a tempering liquid to form a compressive stress layer on a surface. The tempered glass sheet includes the compressive stress layer on a main surface, and hence has improved resistance to impact on the main surface. Meanwhile, in an inside of the tempered glass sheet, a tensile stress layer is formed in conformity with the compressive stress layer on the main surface. Then, there has been a problem of breakage (so-called self-destruction) caused by extension of cracks formed on an end surface owing to a tensile stress. In addition, there has been a problem in that, when the compressive stress layer is formed to be thin over the glass sheet in order to reduce the tensile stress, sufficient impact resistance is not obtained on the end surface.

In order to solve the above-mentioned problems, there has been developed a technology involving appropriately setting the balance in compressive stress between the main surface and the end surface of the tempered glass sheet, to thereby reduce an internal tensile stress within an appropriate range. For example, in Patent Literature 1, there is disclosed a technology involving forming a film on the main surface in advance to suppress the degree of progress of chemical tempering on the main surface as compared to on the end surface, to thereby control the depth of layer of the compressive stress layer of the main surface without reducing the compressive stress layer of the end surface to reduce the internal tensile stress.

CITATION LIST

Patent Literature 1: JP 2014-208570 A

SUMMARY OF INVENTION

Technical Problem

Incidentally, in the case where cracks are formed in the tempered glass sheet incorporated as a cover glass in an electronic device, such as a smartphone, the overall function of a smartphone is not disturbed and the smartphone can be continuously used to some degree in some cases when a crack extension region is partially formed. That is, it is considered that fatal breakage can be suppressed in the electronic device when a crack extension mode can be controlled. However, in the related art, no investigation has been made into control of the crack extension mode.

The present invention has been made in view of the above-mentioned circumstances, and an object of the present invention is to provide a tempered glass sheet which has high strength and in which a crack extension mode can be controlled, and a method of producing the same.

Solution to Problem

According to one embodiment of the present invention, there is provided a tempered glass sheet including a compressive stress layer having a compressive stress on a main surface, and a tensile stress layer having a tensile stress in an inside, the tempered glass sheet comprising: a highly anisotropic stress region which is arranged in at least part of an end edge portion, and which has a stress showing anisotropy in a plane parallel to the main surface; and a low anisotropic stress region which is arranged on a center side in a main surface direction so as to be adjacent to the highly anisotropic stress region, and which has a stress showing lower anisotropy than the highly anisotropic stress region in the same plane parallel to the main surface.

The tempered glass sheet according to the embodiment of the present invention comprises the regions showing a difference in anisotropy, and hence extension of cracks across the regions can be suppressed. Thus, a crack extension mode can be controlled, and fatal breakage can be suppressed in an electronic device on which the tempered glass sheet is mounted.

It is preferred that, in the tempered glass sheet according to the embodiment of the present invention, the highly anisotropic stress region have a stress showing anisotropy in a direction along a contour shape of the end edge portion.

It is preferred that, in the tempered glass sheet according to the embodiment of the present invention, when the compressive stress in a first direction along the contour shape as seen in a sheet thickness direction is defined as a first compressive stress, and the compressive stress in a second direction perpendicular to the first direction in the plane parallel to the main surface is defined as a second compressive stress, the first compressive stress be larger than the second compressive stress in the compressive stress layer in the highly anisotropic stress region.

It is preferred that, in the tempered glass sheet according to the embodiment of the present invention, the first compressive stress in the highly anisotropic stress region be 700 MPa or more, and a difference obtained by subtracting the second compressive stress from the first compressive stress in the highly anisotropic stress region be 15 MPa or more.

It is preferred that, in the tempered glass sheet according to the embodiment of the present invention, when the first compressive stress and the second compressive stress are measured at arbitrary observation points equidistant from a boundary between the highly anisotropic stress region and the low anisotropic stress region in the plane parallel to the main surface, a difference obtained by subtracting the second compressive stress measured at the observation point in the low anisotropic stress region from the first compressive stress measured at the same observation point be smaller than a difference obtained by subtracting the second compressive stress measured at the observation point in the highly anisotropic stress region from the first compressive stress measured at the same observation point.

It is preferred that, in the tempered glass sheet according to the embodiment of the present invention, a difference between the first compressive stress and the second compressive stress in the low anisotropic stress region be 40 MPa or less.

It is preferred that, in the tempered glass sheet according to the embodiment of the present invention, at an arbitrary point in the highly anisotropic stress region as seen in a sheet thickness direction, a depth of layer from the main surface at which the first compressive stress becomes zero be larger than a depth of layer from the main surface at which the second compressive stress becomes zero.

It is preferred that, in the tempered glass sheet according to the embodiment of the present invention, when a retardation in a sheet thickness direction in the highly anisotropic stress region is defined as R (nm), an optical elastic constant of the tempered glass sheet is defined as α (nm/cm/MPa), and a sheet thickness of the tempered glass sheet is defined as t (cm), the following expression (1) be satisfied.

$$R/\alpha t \geq 10 \tag{1}$$

With those configurations, the crack extension mode can be more easily controlled.

It is preferred that, in the tempered glass sheet according to the embodiment of the present invention, the highly anisotropic stress region be arranged along an entirety of the end edge portion, and the low anisotropic stress region be surrounded by the highly anisotropic stress region.

With such configuration, the crack extension mode can be controlled in the entirety of the end edge portion serving as starting points of cracks.

It is preferred that, in the tempered glass sheet according to the embodiment of the present invention, a boundary between the highly anisotropic stress region and the low anisotropic stress region be positioned at 8 mm or less from an end portion of the tempered glass sheet as seen in a sheet thickness direction.

It is preferred that, in the tempered glass sheet according to the embodiment of the present invention, the tempered glass sheet as seen in a sheet thickness direction have a contour shape including a linear side portion, the side portion have a length of from 10 mm to 5,000 mm, the tempered glass sheet have a sheet thickness of from 0.1 mm to 2.0 mm, and the highly anisotropic stress region be arranged in a belt shape along the side portion.

It is preferred that, in the tempered glass sheet according to the embodiment of the present invention, a depth of layer of the compressive stress layer in the highly anisotropic stress region be larger than a depth of layer of the compressive stress layer in the low anisotropic stress region.

With such configuration, occurrence and extension of cracks can be more easily controlled in the end edge portion.

It is preferred that, in the tempered glass sheet according to the embodiment of the present invention, the tensile stress in the highly anisotropic stress region be larger than the tensile stress in the low anisotropic stress region.

With such configuration, for example, when cracks occur or extend in the end edge portion owing to impact, the cracks are caused to extend in a dispersed manner in the highly anisotropic stress region, and thus an impact energy is dispersed, with the result that the cracks are easily suppressed from extending to the low anisotropic stress region. In addition, when the tempered glass sheet is mounted on an electronic device, breakage of the electronic device is easily suppressed through the dispersion of the impact energy.

It is preferred that, in the tempered glass sheet according to the embodiment of the present invention, directions of optical main axes in the highly anisotropic stress region and the low anisotropic stress region be different from each other at a boundary between the highly anisotropic stress region and the low anisotropic stress region.

It is preferred that, in the tempered glass sheet according to the embodiment of the present invention, the compressive stress layer in the highly anisotropic stress region as seen in a sheet thickness direction have an optical main axis in a direction along a contour shape of the end edge portion.

It is preferred that, in the tempered glass sheet according to the embodiment of the present invention, an optical main axis of the compressive stress layer in the highly anisotropic stress region and an optical main axis of the compressive stress layer in the low anisotropic stress region as seen in a sheet thickness direction form an angle of 45 degrees or more.

According to one embodiment of the present invention, there is provided a method of producing a tempered glass sheet including chemically tempering a glass sheet to be tempered through ion exchange, the method comprising: a film forming step of forming an ion exchange suppressing film configured to suppress the ion exchange in a film formation region on a main surface of the glass sheet to be tempered excluding at least part of an end edge portion of the glass sheet to be tempered to provide a glass sheet with a film; and a tempering step of chemically tempering the glass sheet with a film by an ion exchange method to provide a tempered glass sheet.

By the method of producing a tempered glass sheet according to the embodiment of the present invention, the tempered glass sheet according to the above-mentioned embodiment of the present invention can be easily produced.

It is preferred that, in the method of producing a tempered glass sheet according to the embodiment of the present invention, the glass sheet to be tempered as seen in a sheet thickness direction have a contour shape including a linear side portion, and, when a region on the main surface other than the film formation region is defined as a non-film formation region, the non-film formation region be set to a belt shape along the side portion.

It is preferred that, in the method of producing a tempered glass sheet according to the embodiment of the present invention, when a region on the main surface other than the film formation region is defined as a non-film formation region, the non-film formation region be set along an entirety of the end edge portion of the glass sheet to be tempered so as to surround the film formation region.

It is preferred that, in the method of producing a tempered glass sheet according to the embodiment of the present invention, when a region on the main surface other than the film formation region is defined as a non-film formation region, a boundary between the film formation region and the non-film formation region be set to a position of 8 mm or less from an end portion of the glass sheet to be tempered as seen in a sheet thickness direction.

With those configurations, occurrence and extension of cracks are easily suppressed in the end edge portion of the tempered glass sheet to be obtained.

It is preferred that the method of producing a tempered glass sheet according to the embodiment of the present invention further comprise, after the tempering step, a removal step of removing the ion exchange suppressing film.

With such configuration, the tempered glass sheet having high transparency and a smooth main surface can be obtained.

DESCRIPTION OF EMBODIMENTS

Figure 1:
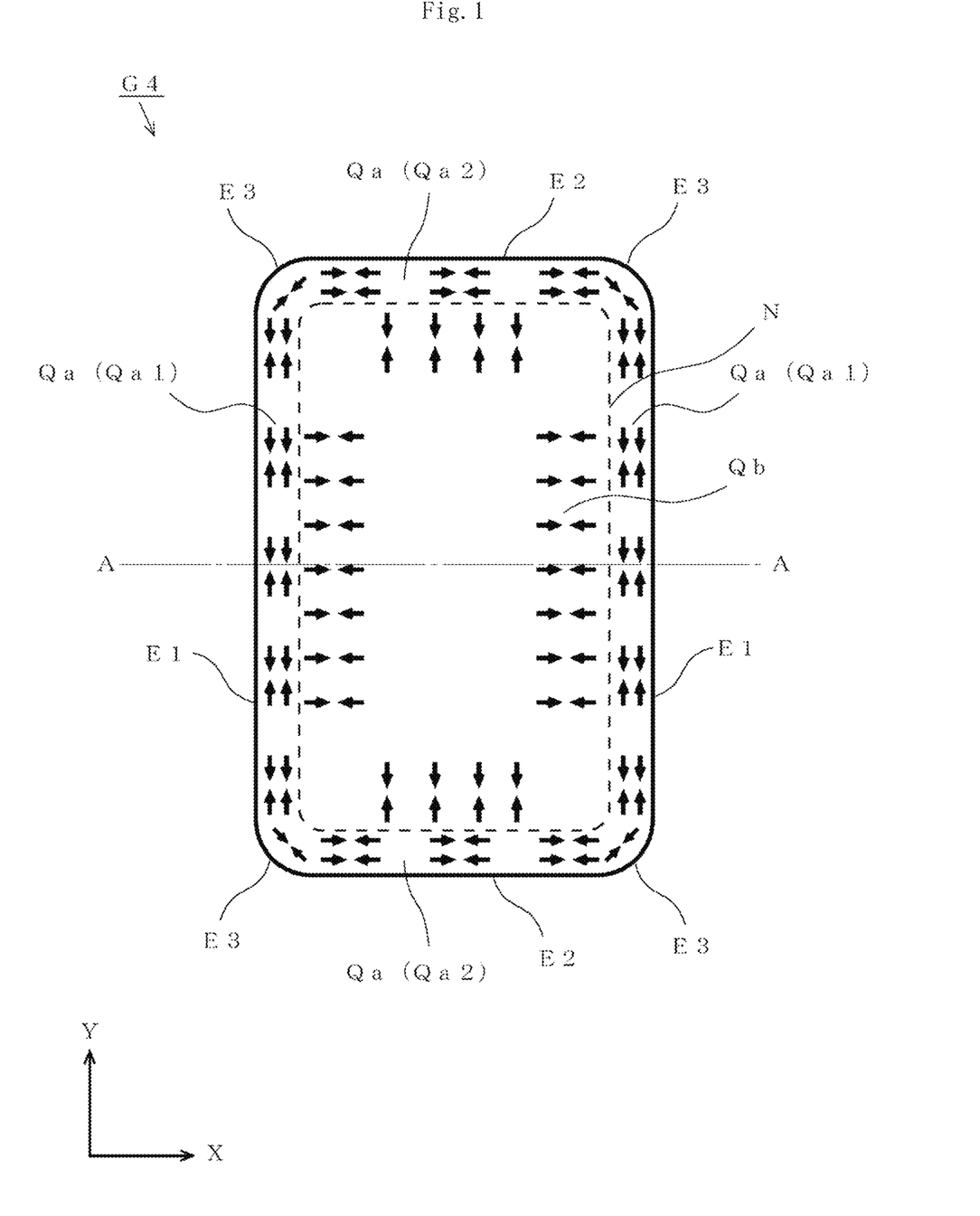
FIG. 1 is a view for illustrating an example of a tempered glass sheet according to an embodiment of the present invention as seen in a sheet thickness direction.
Figure 2:
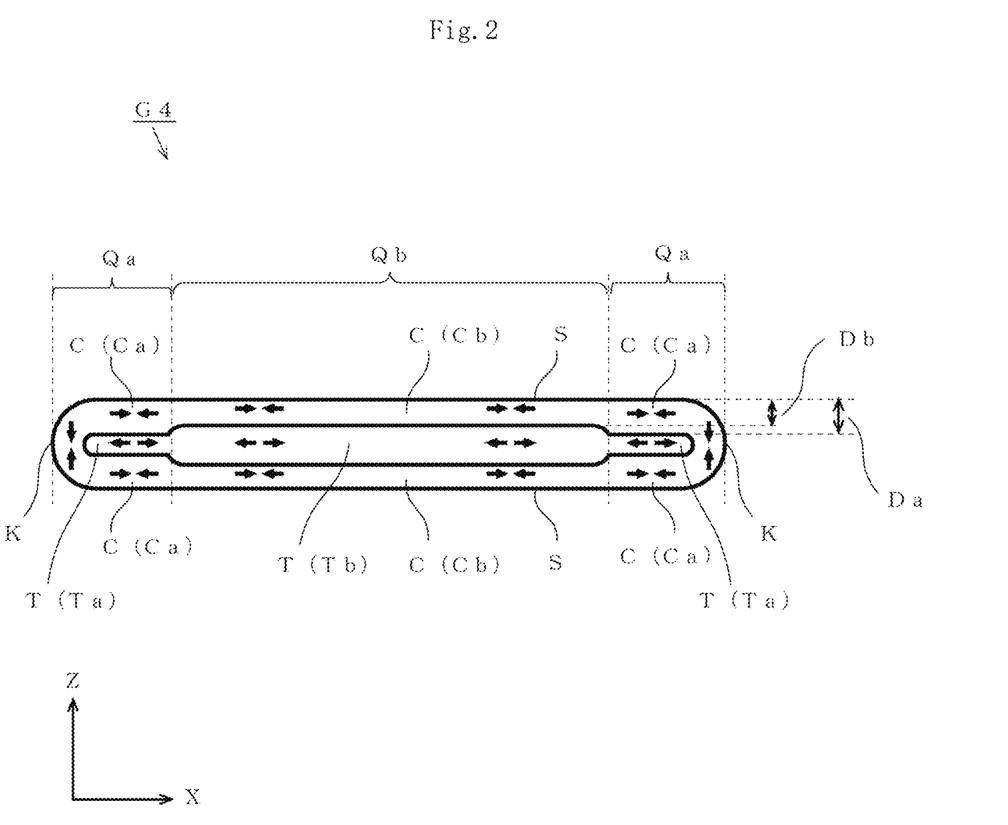
FIG. 2 is a view for illustrating the A-A cross section of the tempered glass sheet according to the embodiment of the present invention of FIG. 1.

Now, a tempered glass sheet G4 and a method of producing the same according to embodiments of the present invention are described. FIG. 1 is a view for illustrating an example of the tempered glass sheet G4 of the present invention as seen in a sheet thickness direction (in the Z direction of FIG. 2). FIG. 2 is a view for illustrating the A-A cross section of the tempered glass sheet G4 of the present invention of FIG. 1.

The tempered glass sheet G4 is a tempered glass sheet including compressive stress layers C (Ca and Cb) each having a compressive stress and tensile stress layers T (Ta and Tb) each having a tensile stress. The surface of the tempered glass sheet includes a main surface S and an end surface. In each of FIG. 1 and FIG. 2, main stress action directions are conceptually illustrated. The tempered glass sheet G4 has a substantially rectangular sheet shape. Specifically, the tempered glass sheet G4 as seen in the sheet thickness direction has a contour shape including: a linear long side portion E1; a linear short side portion E2 shorter than the long side portion E1; and a circular arc-shaped or elliptical arc-shaped corner portion E3 configured to connect the long side portion E1 and the short side portion E2.

The sheet thickness of the tempered glass sheet G4 is, for example, 1.5 mm or less, preferably 1.3 mm or less, 1.1 mm or less, 1.0 mm or less, 0.8 mm or less, 0.7 mm or less, 0.6 mm or less, 0.5 mm or less, 0.4 mm or less, 0.3 mm or less, or 0.2 mm or less, particularly preferably 0.1 mm or less. As the sheet thickness of the tempered glass sheet becomes smaller, the weight of the tempered glass sheet substrate can be reduced more. As a result, thinning and weight saving of a device can be achieved. The sheet thickness of the tempered glass sheet G4 is preferably 0.01 mm or more in consideration of productivity and the like. The tempered glass sheet G4 has width and length dimensions of, for example, from 10 mm×10 mm to 5,000 mm×5,000 mm, preferably from 480 mm×320 mm to 3,350 mm×3,950 mm.

The tempered glass sheet G4 comprises a highly anisotropic stress region Qa and a low anisotropic stress region Qb. The highly anisotropic stress region Qa is arranged in an end edge portion of the glass sheet G4. The low anisotropic stress region Qb is arranged on a center side with respect to the highly anisotropic stress region Qa in a main surface direction so as to be adjacent to the highly anisotropic stress region Qa. In this embodiment, the highly anisotropic stress region Qa is arranged along the entirety of the end edge portion of the tempered glass sheet G4 so as to form a belt shape having a constant width along the long side portion E1, the short side portion E2, and the corner portion E3. In addition, the low anisotropic stress region Qb is positioned so as to be surrounded by the highly anisotropic stress region Qa. A boundary N between the highly anisotropic stress region Qa and the low anisotropic stress region Qb is positioned at, for example, 8 mm or less from an edge K of the tempered glass sheet G4. The "edge K" means an end portion of the tempered glass sheet G4 as seen in the sheet thickness direction, and in this embodiment, refers to a top of the end surface of the tempered glass sheet G4 in a sectional view.

The highly anisotropic stress region Qa is a region having a stress showing higher anisotropy in a plane parallel to the main surface S than the low anisotropic stress region Qb in the same plane parallel to the main surface S. In the present invention, when stresses measured in a plurality of directions at an arbitrary observation point in a predetermined region vary in magnitude, and directions of maximum stresses measured at a plurality of the observation points are coincident with each other, it is regarded that the stress in the region shows anisotropy. In addition, it is regarded that the stress in the region shows higher anisotropy when a difference between a maximum value and a minimum value for the stress measured at an arbitrary observation point in the predetermined region is larger.

The compressive stress layer Ca in the highly anisotropic stress region Qa has a compressive stress showing anisotropy in a plane (in the XY plane of each of FIG. 1 and FIG. 2) parallel to the main surface S. In this embodiment, the compressive stress layer Ca in the highly anisotropic stress region Qa has a compressive stress showing anisotropy in a direction along the contour shape of the end edge portion, that is, in a direction along the long side portion E1, the short side portion E2, and the corner portion E3. In addition, the tensile stress layer Ta in the highly anisotropic stress region Qa has a tensile stress showing anisotropy in a plane parallel to the main surface S in a direction along the contour shape of the end edge portion.

The low anisotropic stress region Qb is a region having a stress showing lower anisotropy than the highly anisotropic stress region Qa in the same plane (in the XY plane of each of FIG. 1 and FIG. 2) parallel to the main surface S. In this embodiment, the compressive stress layer Cb in the low anisotropic stress region Qb has a compressive stress showing anisotropy in the plane parallel to the main surface S in a direction substantially perpendicular to the contour shape of the end edge portion, that is, in a direction perpendicular to the long side portion E1 and the short side portion E2.

Specifically, in the compressive stress layer Ca in a highly anisotropic stress region Qa1 along the long side portion E1, a compressive stress in the Y direction parallel to the long side portion E1 is larger than a compressive stress in the X direction perpendicular to the Y direction in the plane parallel to the main surface S. In the compressive stress layer Ca in a highly anisotropic stress region Qa2 along the short side portion E2, a compressive stress in the X direction along the short side portion E2 is larger than a compressive stress in the Y direction.

When a compressive stress in a first direction along the contour shape as seen in the sheet thickness direction (in the Z direction) is defined as a first compressive stress CS1, and a compressive stress in a second direction perpendicular to the first direction in the plane (in the XY plane) parallel to the main surface S is defined as a second compressive stress CS2, a difference ΔCS obtained by subtracting the second compressive stress CS2 from the first compressive stress CS1 is used as an indicator of the degree of anisotropy. As the compressive stress shows higher anisotropy in a direction along the contour shape, the ΔCS becomes larger.

The ΔCS (ΔCSa) (i.e., a first difference (ΔCS1)) in the highly (i.e., first) anisotropic stress region Qa is preferably 10 MPa or more. The ΔCS (ΔCSa) in the highly anisotropic stress region Qa is more preferably 20 MPa or more, still more preferably 30 MPa or more. In addition, the first compressive stress CS1 in the highly anisotropic stress region Qa is preferably 700 MPa or more.

At an arbitrary point in the highly anisotropic stress region Qa as seen in the sheet thickness direction, a depth of layer DOLzero1 from the main surface S at which the first compressive stress CS1 becomes zero is preferably larger than a depth of layer DOLzero2 from the main surface S at which the second compressive stress CS2 becomes zero. That is, in the tempered glass G4 having stress components having different magnitudes in different directions, a position in a depth direction at which the compressive stress and the tensile stress are balanced with each other varies between the stress components in the different directions. With such configuration, a crack extension mode can be suitably controlled.

In addition, when a retardation in the sheet thickness direction in the highly anisotropic stress region Qa is defined as R (nm), an optical elastic constant of the tempered glass sheet G4 is defined as α (nm/cm/MPa), and a sheet thickness of the tempered glass sheet G4 is defined as t (cm), the following expression (1) is preferably satisfied. As the stress in the highly anisotropic stress region Qa shows higher anisotropy, a value for R/αt becomes larger.

$$R/\alpha t \geq 10 \quad (1)$$

The low anisotropic stress region Qb is a region having a stress showing lower anisotropy than the highly anisotropic stress region Qa or having a stress showing no anisotropy. The compressive stress layer Cb in the low anisotropic stress region Qb has a compressive stress showing lower anisotropy than the highly anisotropic stress region Qa in the plane (in the XY plane of each of FIG. 1 and FIG. 2) parallel to the main surface S. The ΔCS (ΔCSb) in the low anisotropic stress region Qb is preferably smaller than the ΔCS (ΔCSa) in the highly anisotropic stress region Qa. In addition, a difference value between the absolute value of the ΔCS (ΔCSa) in the highly anisotropic stress region Qa and the absolute value of the ΔCS (ΔCSb) in the low anisotropic stress region Qb is preferably 30 MPa or more. With such configuration, differences in degree and direction of anisotropy between the highly anisotropic stress region Qa and the low anisotropic stress region Qb become remarkable, and extension of cracks across the boundary between these regions can be more effectively suppressed.

Glass having a stress showing anisotropy has a retardation and an optical main axis corresponding to the stress. In the tempered glass sheet G4 in this embodiment as seen in the sheet thickness direction, the direction in which the stress shows anisotropy is substantially coincident with the direction of the optical main axis in the region (the thick arrow extension direction of FIG. 1). In the tempered glass sheet G4, the directions of anisotropy in the highly anisotropic stress region Qa and the low anisotropic stress region Qb differ from each other in the vicinity of the boundary N between these regions, and hence the directions of the optical main axes in the highly anisotropic stress region Qa and the low anisotropic stress region Qb differ from each other at the boundary N between these regions. In addition, the direction of the optical main axis of the compressive stress layer Ca in the highly anisotropic stress region Qa is a direction along the contour shape. The optical main axis of the compressive stress layer Ca and the optical main axis of the compressive stress layer Cb as seen in the sheet thickness direction preferably form an angle of 45 degrees or more.

As described above, the tempered glass sheet G4 according to the embodiment of the present invention comprises the highly anisotropic stress region Qa and the low anisotropic stress region Qb showing a difference in anisotropy. Thus, extension of cracks across those regions is less liable to occur. Accordingly, extension of cracks from the end edge portion to a center portion of the main surface can be suppressed, and fatal breakage can be suppressed in an electronic device to which the tempered glass sheet G4 is mounted.

In addition, the difference ΔCSb (i.e., a second difference (ΔCS2)) between the first compressive stress CS1 (i.e., CS3) and the second compressive stress CS2 (i.e., CS4) in the low (i.e., second) anisotropic stress region Qb is preferably 40 MPa or less. The ΔCSb is more preferably 25 MPa or less, still more preferably 15 MPa or less. With such configuration, a difference in anisotropy between the highly anisotropic stress region Qa and the low anisotropic stress region Qb becomes remarkable, and extension of cracks across the boundary between these regions can be more effectively suppressed.

A depth of layer Da of the compressive stress layer Ca in the highly anisotropic stress region Qa is preferably larger than a depth of layer Db of the compressive stress layer Cb in the low anisotropic stress region Qb. The breakage of the tempered glass is often caused by extension of cracks starting not only from the end surface but also from the end edge portion. With such configuration, high strength as compared to related-art tempered glass is achieved in the end edge portion, and the breakage starting from the end edge portion can be suitably suppressed.

While the details are described later, ion exchange is performed to a larger depth in the highly anisotropic stress region Qa than in the low anisotropic stress region Qb in a production process for the tempered glass sheet G4, and hence the Da is larger than the Db as described above. Along with this, the highly anisotropic stress region Qa expands as compared to the low anisotropic stress region Qb in some cases. Accordingly, the sheet thickness of the tempered glass sheet G4 in the highly anisotropic stress region Qa may be larger than the sheet thickness of the tempered glass sheet G4 in the low anisotropic stress region Qb. In this case, a difference ΔQt in sheet thickness, which is a difference between the sheet thickness in the highly anisotropic stress region Qa and the sheet thickness in the low anisotropic stress region Qb, is preferably from 0 μm to 2 μm, more preferably from 0.1 μm to 1.8 μm. In the case where the difference ΔQt in sheet thickness falls within the above-mentioned range, the tempered glass sheet G4 does not have an excessively large difference in surface level, and operability and viewability are not reduced when used in a touch panel display or the like. In addition, when the sheet thickness in the highly anisotropic stress region Qa is larger than the sheet thickness in the low anisotropic stress region Qb, that is, the tempered glass sheet G4 has a larger thickness in the end edge portion than in the center portion, for example, impact applied to the center portion of the main surface at the time of dropping of the tempered glass sheet G4 is reduced, and fatal breakage starting from the main surface is easily suppressed.

The depth of layer Da of the compressive stress layer Ca in the highly anisotropic stress region Qa is preferably ¼ or less of the sheet thickness of the tempered glass sheet G4. In addition, the depth of layer Db of the compressive stress layer Cb in the low anisotropic stress region Qb is preferably ⅛ or less of the sheet thickness of the tempered glass sheet G4.

A tensile stress CTa of the tensile stress layer Ta in the highly anisotropic stress region Qa is preferably larger than a tensile stress CTb of the tensile stress layer Tb in the low anisotropic stress region Qb. With such configuration, even when impact is applied to the end edge portion and cracks extend from the end edge portion, the cracks easily extend in a branched and diffused manner in the highly anisotropic stress region Qa, and hence an impact energy is easily absorbed, with the result that the cracks can be suppressed from extending to the low anisotropic stress region Qb. That is, fatal split can be suppressed in the center portion of the main surface of the tempered glass sheet G4.

In addition, the area of the low anisotropic stress region Qb is preferably larger than the area of the highly anisotropic stress region Qa as seen in the sheet thickness direction (in the Z direction). As the area of the low anisotropic stress region Qb is relatively increased more, the stress in the low anisotropic stress region Qb easily shows lower anisotropy in the main surface direction. As a result, a difference in anisotropy between the highly anisotropic stress region Qa and the low anisotropic stress region Qb becomes remarkable, and extension of cracks across these regions can be more effectively suppressed.

The above-mentioned shape of the tempered glass sheet G4 is an example, and the shape of the tempered glass sheet G4 may be appropriately changed. For example, the tempered glass sheet G4 may have a through hole or a recessed hole on part of the main surface, or may have an end surface shape having been subjected to chamfering processing, such as so-called C chamfering or R chamfering.

In addition, while, in the above-mentioned embodiment, the case in which the highly anisotropic stress region Qa is arranged along the entirety of the end edge portion of the tempered glass sheet G4 has been described as an example, the highly anisotropic stress region Qa may be arranged at an arbitrary position in at least part of the end edge portion of the glass sheet G4. In addition, the shape of the highly anisotropic stress region Qa may be appropriately changed. For example, the width or the shape of the highly anisotropic stress region Qa may be partially changed in a such manner that the width of the highly anisotropic stress region Qa is set so as to be thicker only in a portion along the short side portion E2 or thinner only in a portion along the corner portion E3.

While, in the above-mentioned embodiment, the case in which the low anisotropic stress region Qb has a stress showing anisotropy has been described as an example, the stress in the low anisotropic stress region Qb does not always need to show anisotropy. That is, the present invention may include a mode in which the ΔCSb in the low anisotropic stress region Qb is zero.

Next, a method of producing a tempered glass sheet of the present invention is described. FIG. 3 are views for illustrating an example of a method of producing the tempered glass sheet G4 of the present invention.

Figure 3A:
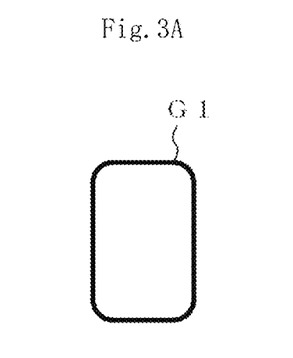
FIG. 3A is a view for illustrating a step included in an example of a method of producing a tempered glass sheet according to an embodiment of the present invention.

First, the treatment in a preparation step illustrated in FIG. 3A is performed. The preparation step is a step of preparing a glass sheet G1 to be tempered. The glass sheet G1 to be tempered is a glass which can be tempered by an ion exchange method.

It is preferred that the glass sheet G1 to be tempered comprise as a glass composition, in terms of mass %, 45% to 75% of $SiO_2$, 1% to 30% of $Al_2O_3$, 0% to 20% of $Na_2O$, and 0% to 20% of $K_2O$. When a glass composition range is regulated as described above, both ion exchange performance and devitrification resistance are easily satisfied at high level.

The shape and dimensions of the glass sheet G1 to be tempered may be set to, for example, the same contents as those of the tempered glass sheet G4 described above. The glass sheet G1 to be tempered may be regarded as having a constant thickness excluding a site having been subjected to chamfering processing, hole opening processing, or the like.

It is preferred that the glass sheet G1 to be tempered be formed by an overflow down-draw method, and a main surface S thereof be free from being polished. With the glass sheet G1 to be tempered formed as described above, a tempered glass sheet having high surface quality is obtained at low cost. A forming method for the glass sheet G1 to be tempered and a processing state thereof may be appropriately selected. For example, the glass sheet G1 to be tempered may be formed by a float method, and the main surface thereof may be polished.

Figure 3B:
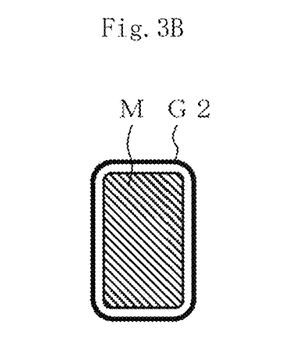
FIG. 3B is a view for illustrating a step included in the example of the method of producing a tempered glass sheet according to the embodiment of the present invention.

Next, after the preparation step, the treatment in a film forming step illustrated in FIG. 3B is performed. The film forming step is a step of forming an ion exchange suppressing film M on the surface of the glass sheet G1 to be tempered to provide a glass sheet G2 with a film. The ion exchange suppressing film M is a film layer configured to suppress the permeation of an alkali metal ion to be subjected to ion exchange in a tempering step described later. The ion exchange suppressing film M is preferably a film which does not completely block the permeation of the ion to be subjected to ion exchange, and which allows appropriate permeation of the ion.

The ion exchange suppressing film M is formed in a film formation region, which is appropriately set to a region of each of both main surfaces of the glass sheet G1 to be tempered excluding at least part of an end edge portion of the glass sheet G1 to be tempered. That is, the at least part of the end edge portion serves as a non-film formation region in which the ion exchange suppressing film M is not formed. The highly anisotropic stress region Qa of the tempered glass sheet G4 is formed so as to substantially correspond to the non-film formation region. In addition, the low anisotropic stress region Qb of the tempered glass sheet G4 is formed so as to substantially correspond to the film formation region. Accordingly, when the highly anisotropic stress region Qa of the tempered glass sheet G4 as illustrated in FIG. 1 is to be obtained, the non-film formation region is set to a belt shape having a constant width along the long side portion E1, the short side portion E2, and the corner portion E3, and the ion exchange suppressing film M is formed only in a center portion of the main surface so as to be surrounded by the non-film formation region. In addition, when a boundary between the film formation region and the non-film formation region is set to a position of 8 mm or less from the edge K, the boundary N between the highly anisotropic stress region Qa and the low anisotropic stress region Qb can be set to the same position.

As a material for the ion exchange suppressing film M, any material may be used as long as the permeation of an alkali metal ion can be suppressed. However, it is preferred that the material have such mechanical strength and chemical durability that the material is less liable to be broken in a processing step and the tempering step. Specifically, it is preferred that the ion exchange suppressing film M have a Young's modulus which is from 0.5 time to 2.0 times a Young's modulus of the glass sheet G1 to be tempered. When the Young's modulus of the ion exchange suppressing film M is less than 0.5 time the Young's modulus of the glass sheet G1 to be tempered, the glass sheet G1 to be tempered cannot be sufficiently protected in the processing step and the like, and defects, such as scratches, are liable to occur. Meanwhile, when the Young's modulus of the ion exchange suppressing film M is 2.0 times or more the Young's modulus of the glass sheet G1 to be tempered, the ion exchange suppressing film M is liable to be cracked to be broken in the processing step and like.

In order to obtain the strength characteristics as described above, it is preferred that the ion exchange suppressing film M be a metal oxide film, a metal nitride film, a metal carbide film, a metal oxynitride film, a metal oxycarbide film, a metal carbonitride film, or the like. In this case, the ion exchange suppressing film M may be a film containing one or more kinds selected from $SiO_2$, $Al_2O_3$, SiN, SiC, AlN, $ZrO_2$, $TiO_2$, $Ta_2O_5$, $Nb_2O_5$, $HfO_2$, and $SnO_2$.

The ion exchange suppressing film M may be a film formed of only $SiO_2$. Specifically, the ion exchange suppressing film M may have a composition comprising, in terms of mass %, 99% or more of $SiO_2$. With such composition, the ion exchange suppressing film M can be formed easily at low cost. However, with such configuration, it becomes difficult to sufficiently obtain an ion permeation suppressing effect or obtain high mechanical strength in some cases. Therefore, when the ion exchange suppressing film M comprises $SiO_2$ as a main component, it is preferred that any additive having a Young's modulus higher than that of $SiO_2$ be added in addition to $SiO_2$. Examples of such additive include $Al_2O_3$, SiN, SiC, AlN, $ZrO_2$, $TiO_2$, $Ta_2O_5$, $Nb_2O_5$, $HfO_2$, and $SnO_2$ described above. In particular, it is preferred to select $Al_2O_3$, which has a relatively low refractive index.

When an inorganic film comprising $SiO_2$ as a main component and further comprising $Al_2O_3$ is used as the ion exchange suppressing film M, the ion exchange suppressing film M preferably comprises as a composition, in terms of mass %, 60% to 96% of $SiO_2$ and 4% to 40% of $Al_2O_3$. In this case, the content of $SiO_2$ is, in terms of mass %, preferably from 60% to 96%, more preferably from 65% to 90%, still more preferably from 70% to 85%. When the content of $SiO_2$ falls within the above-mentioned range, a satisfactory antireflection effect can be obtained. In addition, the uniformity of the ion exchange suppressing film M is easily improved. Thus, the degree of tempering of the glass sheet G1 to be tempered is less liable to vary in the tempering step, and the strength quality of a product can be stabilized. The content of $Al_2O_3$ is preferably from 4% to 40%. When the content of $Al_2O_3$ falls within the above-mentioned range, appropriate permeation of an ion can be achieved, and ion exchange can be performed also in the film formation region, while the ion permeation suppressing effect, the mechanical strength, and chemical resistance are increased.

With the ion exchange suppressing film M having the above-mentioned composition, the desired ion permeation suppressing effect, mechanical strength, and chemical resistance can be obtained with a relatively small film thickness. Thus, the production efficiency of a tempered glass sheet can be improved, for example, by shortening the film forming time of the ion exchange suppressing film M and reducing film material cost.

The thickness of the ion exchange suppressing film M is preferably from 5 nm to 2,000 nm, more preferably from 50 nm to 1,000 nm, still more preferably from 100 nm to 600 nm, most preferably from 150 nm to 500 nm. When the thickness of the ion exchange suppressing film M is less than 5 nm, the permeation of an alkali metal ion cannot be sufficiently suppressed in some cases. Meanwhile, when the thickness of the ion exchange suppressing film M is more than 300 nm, the permeation of the alkali metal ion is excessively inhibited, and it becomes difficult to obtain a tempered glass sheet having sufficient strength.

The ion exchange suppressing films M formed on front and back main surfaces (opposing surfaces in the sheet thickness direction) of the glass sheet G2 with a film may have comparable thicknesses. Specifically, a difference in film thickness of the ion exchange suppressing film M between the front and back surfaces of the glass sheet G2 with a film is preferably 100 nm or less, and more preferably falls within a range of from 0.1 nm to 80 nm. When the difference in film thickness between the front and back surfaces falls within the above-mentioned range, the degrees of progress of ion exchange can be controlled to the same degree on the front and back main surfaces of the glass sheet G2 with a film, and warpage or the like of the glass sheet G2 with a film resulting from variation in the degree of progress of ion exchange can be suppressed.

As a method of forming the ion exchange suppressing film M, a physical vapor deposition (PVD) method, such as a sputtering method or a vacuum deposition method, a chemical vapor deposition (CVD) method, such as a thermal CVD method or a plasma CVD method, and a wet coating method, such as a dip coating method or a slit coating method, may be used. In particular, the sputtering method and the dip coating method are preferred. When the sputtering method is used, the ion exchange suppressing film M can be uniformly formed with ease. When the dip coating method is used, the ion exchange suppressing films M can be formed with high productivity simultaneously on both opposing main surfaces of the glass sheet.

Figure 3C:
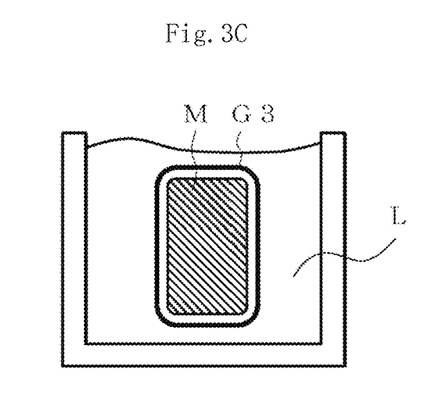
FIG. 3C is a view for illustrating a step included in the example of the method of producing a tempered glass sheet according to the embodiment of the present invention.
Figure 3D:
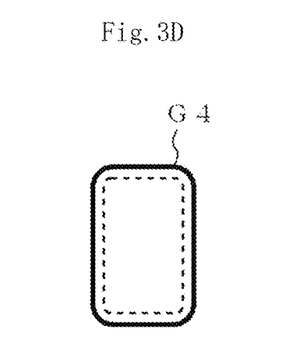
FIG. 3D is a view for illustrating a step included in the example of the method of producing a tempered glass sheet according to the embodiment of the present invention.

Next, after the film forming step, the treatment in the tempering step illustrated in FIG. 3C is performed. The tempering step is a step of chemically tempering the glass sheet G2 with a film by an ion exchange method to provide a tempered glass sheet G3 with a film. Specifically, the glass sheet G2 with a film is immersed in a tempering liquid L of a potassium nitrate molten salt at from 350° C. to 500° C. for, for example, from 0.1 hour to 150 hours, preferably from 1 hour to 150 hours, more preferably from 2 hours to 24 hours. The tempering liquid L may also be a mixed liquid (mixed salt) of a potassium nitrate molten salt and a sodium nitrate molten salt.

In the tempering step, a sodium ion on the surface of the glass sheet G2 with a film is exchanged with a potassium ion in the tempering liquid L, and thus the tempered glass sheet G3 having the compressive stress layer C on the surface is obtained. Herein, on the surface of the glass sheet G2 with a film, ion exchange is suppressed more in the film formation region (i.e., the center portion of the main surface S) in which the ion exchange suppressing film M is arranged than in the non-film formation region (i.e., the end edge portion and the end surface) in which the surface of the glass sheet G1 to be tempered is exposed. Meanwhile, the ion exchange progresses more easily in the non-film formation region than in the site in which the ion exchange suppressing film M is arranged. While the glass sheet G2 with a film is to expand when an alkali metal ion having a large ionic radius is introduced thereinto, the non-film formation region having a relatively large introduction amount is to expand and deform to a higher degree than the film formation region having a relatively small introduction amount. However, the deformation of the non-film formation region is constrained by the adjacent film formation region, and hence a stress based on the force of expansion and the force of constraint occurs in the non-film formation region. Further, the stress shows anisotropy corresponding to the direction of expansion and the direction of constraint of the glass sheet G2 with a film. Thus, the highly anisotropic stress region Qa is formed in the non-film formation region.

When the film formation region is set to a shape along the contour shape, the force of expansion and the force of constraint each easily act in a direction along the contour shape, and hence a stress showing anisotropy in the direction along the contour shape easily occurs.

In addition, because of a difference in degree of progress of ion exchange as described above, the depth of layer Db of the compressive stress layer Cb in the film formation region (low anisotropic stress region Qb) is smaller than the depth of layer Da of the compressive stress layer Ca in the non-film formation region (highly anisotropic stress region Qa and the end surface) in the tempered glass sheet G3. In addition, in accordance with a difference in depth of layer of the compressive stress layer as described above, the tensile stress CTa of the tensile stress layer Ta in the highly anisotropic stress region Qa is smaller than the tensile stress CTb of the tensile stress layer Tb in the low anisotropic stress region Qb.

Treatment conditions, such as a treatment temperature and an immersion time, in the tempering step may be appropriately set depending on the characteristics required for the tempered glass sheet G3. It is preferred that the treatment conditions be adjusted so that the depth of layer of the compressive stress layer in the film formation region is smaller than the depth of layer of the compressive stress layer in the non-film formation region in the tempered glass sheet G3.

The ion exchange suppressing film M also functions as a protective coat or an antireflection film of an electronic device. Therefore, the tempered glass sheet G3 may also be directly used as a product, but the ion exchange suppressing film M is preferably removed depending on the applications. In a removal step illustrated in FIG. 3D, the ion exchange suppressing film M is removed from the tempered glass sheet G3 to provide the tempered glass sheet G4.

Specifically, the ion exchange suppressing film M is removed, for example, by polishing the tempered glass sheet G3 or causing an etchant to adhere to the tempered glass sheet G3 by a well-known method. In the removal step, only the ion exchange suppressing film M on one main surface side or the ion exchange suppressing films M on both main surface sides may be removed. In addition, the ion exchange suppressing film M may be partially removed on each of the main surfaces, or the ion exchange suppressing film M may be entirely removed on each of the main surfaces.

As described above, the tempered glass sheets G3 and G4 can be produced efficiently by the method of producing a tempered glass sheet according to the embodiment of the present invention. The tempered glass sheet G3 has stress characteristics comparable to those of the tempered glass sheet G4 described above except that the ion exchange suppressing film M is included.

The above-mentioned material for the ion exchange suppressing film M is an example, and any material may be used as long as the film is capable of suppressing the permeation of an alkali metal ion.

In addition, the film formation region and the non-film formation region for the ion exchange suppressing film M may be appropriately deformed in accordance with the shapes of the highly anisotropic stress region Qa and the low anisotropic stress region Qb to be formed.

In addition, a processing step, a washing step, and a drying step may be appropriately provided before and after each of the above-mentioned steps. In the processing step, the glass sheet G1 to be tempered, the glass sheet G2 with a film, or the tempered glass sheet G3 or G4 may be subjected to any treatment using a technology which has hitherto been well known, such as end surface grinding processing, end surface polishing processing, corner cutting processing, chamfering processing, hole opening processing, laser processing, or etching processing.

In addition, while, in the above-mentioned embodiment, the case in which the glass sheet G1 to be tempered has a constant sheet thickness has been described as an example, the sheet thickness of the glass sheet G1 to be tempered may be appropriately set. For example, in consideration of a difference in expansion amount between the highly anisotropic stress region Qa and the low anisotropic stress region Qb, the following adjustment may be adopted: the thickness in the highly anisotropic stress region Qa, that is, the thickness in the non-film formation region is set to a smaller value in advance so that a difference ΔQt in sheet thickness between the highly anisotropic stress region Qa and the low anisotropic stress region Qb is reduced or becomes zero after the tempering step.

In addition, in the above-mentioned removal step, the main surface of the tempered glass sheet G3 may be processed simultaneously with the removal of the ion exchange suppressing film M so that a difference in expansion amount between the highly anisotropic stress region Qa and the low anisotropic stress region Qb is reduced or becomes zero. For example, processing in which the highly anisotropic stress region Qa is polished together with the ion exchange suppressing film M may be performed. Through such processing, the tempered glass sheet G4 having a flat main surface is obtained.

In addition, while, in the above-mentioned embodiment, the case in which the glass sheet G2 with a film is chemically tempered through exchange between a sodium ion and a potassium ion has been described as an example, the glass sheet G2 with a film may be chemically tempered through exchange of any ions. For example, the glass sheet G2 with a film may be chemically tempered through exchange between a lithium ion and a sodium ion, or between a lithium ion and a potassium ion. In this case, the glass sheet G2 with a film (the glass sheet G1 to be tempered) preferably comprises as a glass composition, in terms of mass %, 0.5% to 7.5% of $LiO_2$, for example, 3.0% or 4.5% of $LiO_2$.

In addition, the stress characteristics of the tempered glass sheet may be measured with, for example, FSM-6000 manufactured by Orihara industrial Co., Ltd. When the depth of layer of a compressive stress layer of an aluminosilicate-based glass exceeds 100 μm or ion exchange between a lithium ion and a sodium ion is performed, the stress characteristics of the tempered glass sheet may be measured with, for example, SLP-1000 manufactured by Orihara industrial Co., Ltd. When a sectional sample can be produced, for example, by cutting the tempered glass sheet, it is desired to confirm the depth of layer by observing an internal stress distribution with, for example, WPA-micro manufactured by Photonic Lattice, Inc. or Abrio manufactured by Tokyo Instruments, Inc.

EXAMPLES

Now, the present invention is described in detail by way of Examples.

In Table 1, No. 1 represents Example of the present invention, and No. 2 represents Comparative Example of the present invention.

TABLE 1

|  | No. | | |
|---|---|---|---|
|  | 1 | | |
|  | Qa | Qb | 2 |
| CS1 (MPa) | 774 | 868 | 725 |
| CS2 (MPa) | 726 | 881 | 722 |
| ΔCS | 48 | −17 | 3 |
| DOLzero1 (μm) | 67.3 | 26.2 | 63.3 |
| DOLzero2 (μm) | 60.1 | 28.7 | 63.0 |
| CT1 (MPa) | 78.3 | 30.4 | 68.2 |
| CT2 (MPa) | 64.2 | 34.0 | 67.5 |

Each sample shown in Table 1 was produced as described below. First, glass raw materials were mixed and melted so as to contain as a glass composition, in terms of mass %, 61.6% of $SiO_2$, 19.6% of $Al_2O_3$, 0.8% of $B_2O_3$, 16% of $Na_2O$, and 2% of $K_2O$, and formed into a sheet shape having a thickness of 0.8 mm by an overflow down-draw method. The resultant was cut out into a rectangular shape having dimensions of 65 mm×130 mm through scribe cleaving, and an end surface was subjected to grinding and polishing. Thus, a plurality of glass sheets to be tempered each having the above-mentioned shape were obtained. Next, an ion exchange suppressing film having a composition comprising 100% of $SiO_2$ and having a thickness of 200 nm was formed on each of the front and back of the glass sheet to be tempered by a sputtering method. Thus, a glass sheet with a film was obtained. A film formation region was set to a center portion of each of both main surfaces of the glass sheet to be tempered excluding a region within 6 mm from an edge portion of the glass sheet to be tempered as seen in a sheet thickness direction. No film was formed in the case of Sample No. 2. Next, each of the resultant glass sheets to be tempered was chemically tempered by being immersed in a potassium nitrate solution at 430° C. for 1 hour, followed by washing with pure water and natural drying. Thus, tempered glass sheets of Sample Nos. 1 and 2 shown in Table 1 were obtained.

Each glass sample obtained as described above was subjected to the following measurement test.

At an observation point at a position of 4 mm from the boundary N in the vicinity of the middle of the long side portion E1 of each sample in a longitudinal direction, the first compressive stress CS1, the second compressive stress CS2, the depth of layer DOLzero1 from the main surface S at which the first compressive stress CS1 became zero, the depth of layer DOLzero2 from the main surface S at which the second compressive stress CS2 became zero, the tensile stress CT1 in the same direction as the first compressive stress CS1, and the tensile stress CT2 in the same direction as the second compressive stress CS2 were measured with a stress measurement device (FSM-6000LE and FsmXP manufactured by Orihara industrial Co., Ltd.). Values for the CT1 and the CT2 were calculated from the following equations (2) and (3), respectively.

$$CT1 = CS1 \times DOLzero1/(t - 2DOLzero1) \quad (2)$$

$$CT2 = CS2 \times DOLzero2/(t - 2DOLzero2) \quad (3)$$

As shown in Table 1, a value for the ΔCS in the highly anisotropic stress region Qa in Sample No. 1 was larger than a value for the ΔCS in the low anisotropic stress region Qb and a value for the ΔCS in Sample No. 2, and it was revealed that Sample No. 1 showed high anisotropy in the end edge portion.

A stress distribution of Sample No. 1 was observed and measured with a polarizing microscope (WPA-micro manufactured by Photonic Lattice, Inc.). The upper image of FIG. 4 was taken with the polarizing microscope. In the image, a portion having a higher degree of whiteness, that is, a portion having a higher value for brightness corresponds to a region having a higher retardation R in the sheet thickness direction and having a stress showing higher anisotropy. In the lower graph of FIG. 4, the solid line represents the magnitude of R/at on the B-B line of the image. In addition, in the same graph, the broken line represents a value for the angle θ formed by an optical main axis and the long side portion E1 as seen in the sheet thickness direction.

Figure 4:
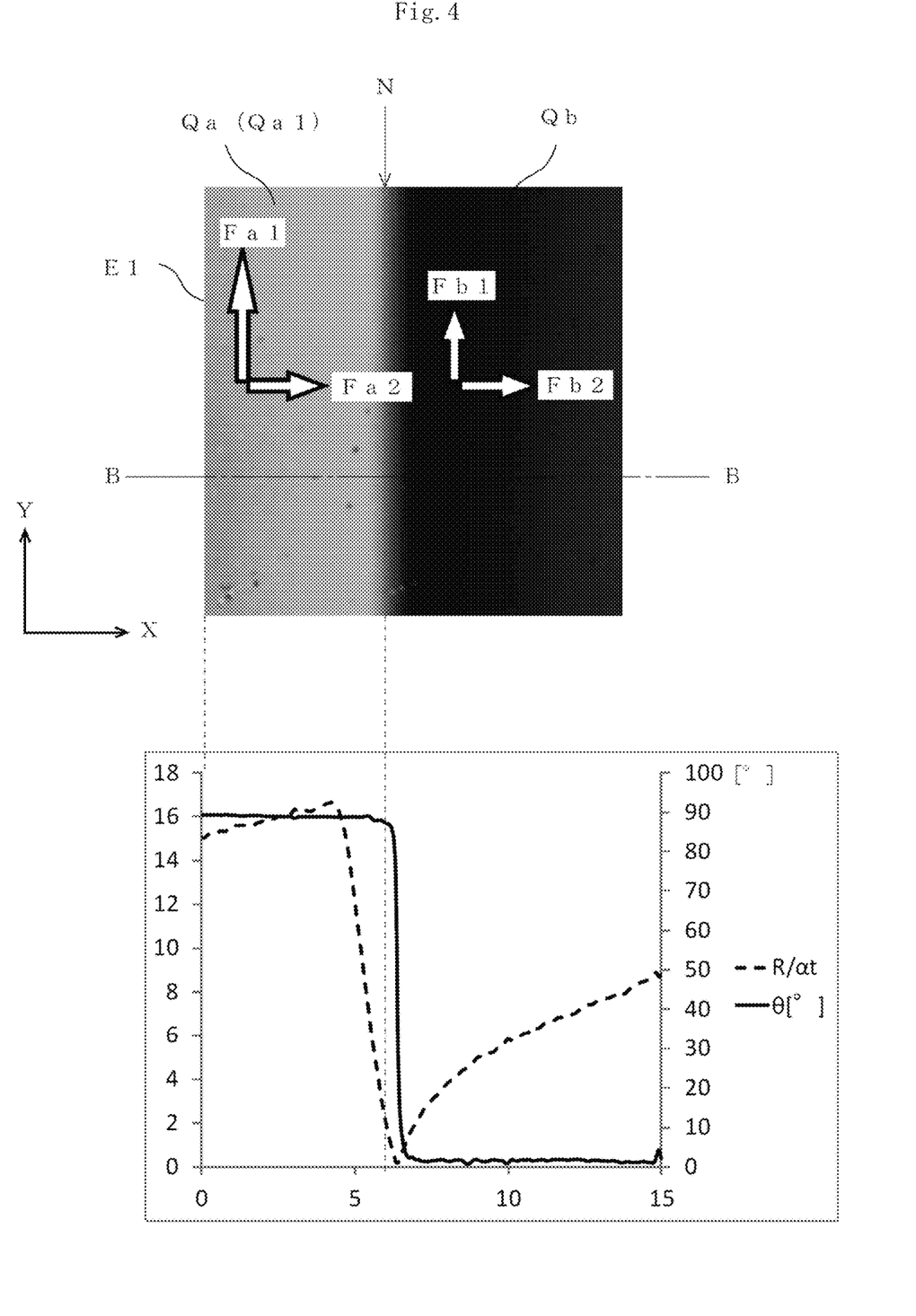
FIG. 4 includes an enlarged photograph for showing a retardation of the tempered glass sheet according to the embodiment of the present invention in a sheet thickness direction and a graph for showing a measurement result of an angle formed by optical main axes of the tempered glass sheet according to the embodiment of the present invention.

It was revealed that the retardation R and the anisotropy were higher in the highly anisotropic stress region Qa than in the low anisotropic stress region Qb. In addition, the value for the angle θ was 1.5° or less in the highly anisotropic stress region Qa. Meanwhile, the value for the angle θ was 85° or more in the low anisotropic stress region Qb. That is, it was revealed that the direction of the anisotropy of the stress in the highly anisotropic stress region Qa and the direction of the anisotropy of the stress in the low anisotropic stress region Qb were substantially orthogonal to each other.

INDUSTRIAL APPLICABILITY

The tempered glass sheet and the method of producing a tempered glass sheet of the present invention are useful as, for example, a glass substrate to be used in a touch panel display or the like and a method of producing the same.

REFERENCE SIGNS LIST

G1 glass sheet to be tempered
G2 glass sheet with film
G3, G4 tempered glass sheet
S main surface
E1 long side portion
E2 short side portion
E3 corner portion
K edge
C compressive stress layer
T tensile stress layer
Qa highly anisotropic stress region
Qb low anisotropic stress region
N boundary
L tempering liquid
M ion exchange suppressing film

The invention claimed is:
1. A tempered glass sheet including a compressive stress layer having a compressive stress on a main surface, and a tensile stress layer having a tensile stress in an inside, the tempered glass sheet comprising:

a first anisotropic stress region which is arranged in at least part of an end edge portion including a part of the main surface, and which has a stress showing anisotropy in a plane parallel to the main surface; and a second anisotropic stress region which is arranged on a center side in a main surface direction so as to be adjacent to the first anisotropic stress region, and which has a stress showing lower anisotropy than the first anisotropic stress region in the same plane parallel to the main surface, wherein the tempered glass sheet is planar, wherein the first anisotropic stress region has a first compressive stress (CS1) in a first direction along a contour shape of the end edge portion as seen in a sheet thickness direction, a second compressive stress (CS2) in a second direction perpendicular to the first direction in the plane parallel to the main surface, and a first difference (ΔCS1) obtained by subtracting the second compressive stress (CS2) from the first compressive stress (CS1), wherein the second anisotropic stress region has a third compressive stress (CS3) in the first direction, a fourth compressive stress (CS4) in the second direction, and a second difference (ΔCS2) obtained by subtracting the fourth compressive stress (CS4) from the third compressive stress (CS3), wherein the second difference (ΔCS2) in the second anisotropic stress region is lower than the first difference (ΔCS1) in the first anisotropic stress region, and wherein a difference between a sheet thickness in the first anisotropic stress region and a sheet thickness in the second anisotropic stress region is from 0 μm to 2 μm.

2. The tempered glass sheet according to claim 1, wherein the first anisotropic stress region has a stress showing anisotropy in a direction along the contour shape of the end edge portion.

3. The tempered glass sheet according to claim 2, wherein the first compressive stress (CS1) is larger than the second compressive stress (CS2) in the compressive stress layer in the first anisotropic stress region.

4. The tempered glass sheet according to claim 3, wherein the first compressive stress (CS1) in the first highly anisotropic stress region is 700 MPa or more, and wherein the first difference (ΔCS1) in the first anisotropic stress region is 15 MPa or more.

5. The tempered glass sheet according to claim 3, wherein, when the first compressive stress (CS1), the second compressive stress (CS2), the third compressive stress (CS3), and the fourth compressive stress (CS4) are measured at arbitrary observation points equidistant from a boundary between the first anisotropic stress region and the second anisotropic stress region in the plane parallel to the main surface, the second difference (ΔCS2) obtained by subtracting the fourth compressive stress (CS4) measured at the observation point in the second anisotropic stress region from the third compressive stress (CS3) measured at the same observation point is smaller than the first difference (ΔCS1) obtained by subtracting the second compressive stress (CS2) measured at the observation point in the first anisotropic stress region from the first compressive stress (CS1) measured at the same observation point.

6. The tempered glass sheet according to claim 3, wherein the second difference (ΔCS2) between the third compressive stress (CS3) and the fourth compressive stress (CS4) in the second anisotropic stress region is 40 MPa or less.

7. The tempered glass sheet according to claim 3, wherein, at an arbitrary point in the first anisotropic stress region as seen in the sheet thickness direction, a depth of layer from the main surface at which the first compressive stress (CS1) becomes zero is larger than a depth of layer from the main surface at which the second compressive stress (CS2) becomes zero.

8. The tempered glass sheet according to claim 1, wherein, when a retardation in a sheet thickness direction in the first anisotropic stress region is defined as R (nm), an optical elastic constant of the tempered glass sheet is defined as a (nm/cm/MPa), and a sheet thickness of the tempered glass sheet is defined as t (cm), the following expression (1) is satisfied.

$$R/\alpha t \geq 10 \qquad (1)$$

9. The tempered glass sheet according to claim 1, wherein the first anisotropic stress region is arranged along an entirety of the end edge portion, and wherein the second anisotropic stress region is surrounded by the first anisotropic stress region.

10. The tempered glass sheet according to claim 1, wherein a boundary between the first anisotropic stress region and the second anisotropic stress region is positioned at more than 0 mm and 8 mm or less from an end portion of the tempered glass sheet as seen in the sheet thickness direction.

11. The tempered glass sheet according to claim 1, wherein the tempered glass sheet as seen in the sheet thickness direction has a contour shape including a linear side portion, wherein the linear side portion has a length of from 10 mm to 5,000 mm, wherein the tempered glass sheet has a sheet thickness of from 0.1 mm to 2.0 mm, and wherein the first anisotropic stress region is arranged in a belt shape along the linear side portion.

12. The tempered glass sheet according to claim 1, wherein a depth of layer of the compressive stress layer in the first anisotropic stress region is larger than a depth of layer of the compressive stress layer in the second anisotropic stress region.

13. The tempered glass sheet according to claim 1, wherein the tensile stress in the first anisotropic stress region is larger than the tensile stress in the second anisotropic stress region.

14. The tempered glass sheet according to claim 1, wherein directions of optical main axes in the first anisotropic stress region and the second anisotropic stress region are different from each other at a boundary between the first anisotropic stress region and the second anisotropic stress region.

15. The tempered glass sheet according to claim 14, wherein the compressive stress layer in the first anisotropic stress region as seen in the sheet thickness direction has an optical main axis in a direction along the contour shape of the end edge portion.

16. The tempered glass sheet according to claim 14, wherein an optical main axis of the compressive stress layer in the first anisotropic stress region and an optical main axis of the compressive stress layer in the second anisotropic stress region as seen in the sheet thickness direction form an angle of 45 degrees or more.

17. A method of producing a tempered glass sheet according to claim 1 including chemically tempering a glass sheet to be tempered through ion exchange, the method comprising:

a preparing step of preparing a glass sheet to be tempered formed by an overflow down-draw method, the glass sheet to be tempered having a constant thickness excluding a site having been subjected to chamfering processing;

a film forming step of forming ion exchange suppressing films configured to suppress ion exchange in a film formation region on both main surfaces of the glass sheet to be tempered excluding at least part of an end edge portion including a part of the main surfaces of the glass sheet to be tempered so that the ion exchange suppressing films are formed symmetrically on both of the main surfaces; and a tempering step of chemically tempering the glass sheet to be tempered having the ion exchange suppressing films by an ion exchange method to provide a tempered glass sheet.

18. The method of producing a tempered glass sheet according to claim 17, wherein the glass sheet to be tempered as seen in a sheet thickness direction has a contour shape including a linear side portion; and wherein, when a region on the main surfaces other than the film formation region is defined as a non-film formation region, the non-film formation region is set to a belt shape along the side portion.

19. The method of producing a tempered glass sheet according to claim 17, wherein, when a region on the main surfaces other than the film formation region is defined as a non-film formation region, the non-film formation region is set along an entirety of the end edge portion of the glass sheet to be tempered so as to surround the film formation region.

20. The method of producing a tempered glass sheet according to claim 17, wherein, when a region on the main surfaces other than the film formation region is defined as a non-film formation region, a boundary between the film formation region and the non-film formation region is set to a position of more than 0 mm and 8 mm or less from an end portion of the glass sheet to be tempered as seen in a sheet thickness direction.

21. The method of producing a tempered glass sheet according to claim 17, further comprising, after the tempering step, a removal step of removing the ion exchange suppressing films.

* * * * *